(No Model.) 3 Sheets—Sheet 1.
A. M. HEWLETT.
PIPE MANUFACTURING APPARATUS.
No. 552,905. Patented Jan. 14, 1896.
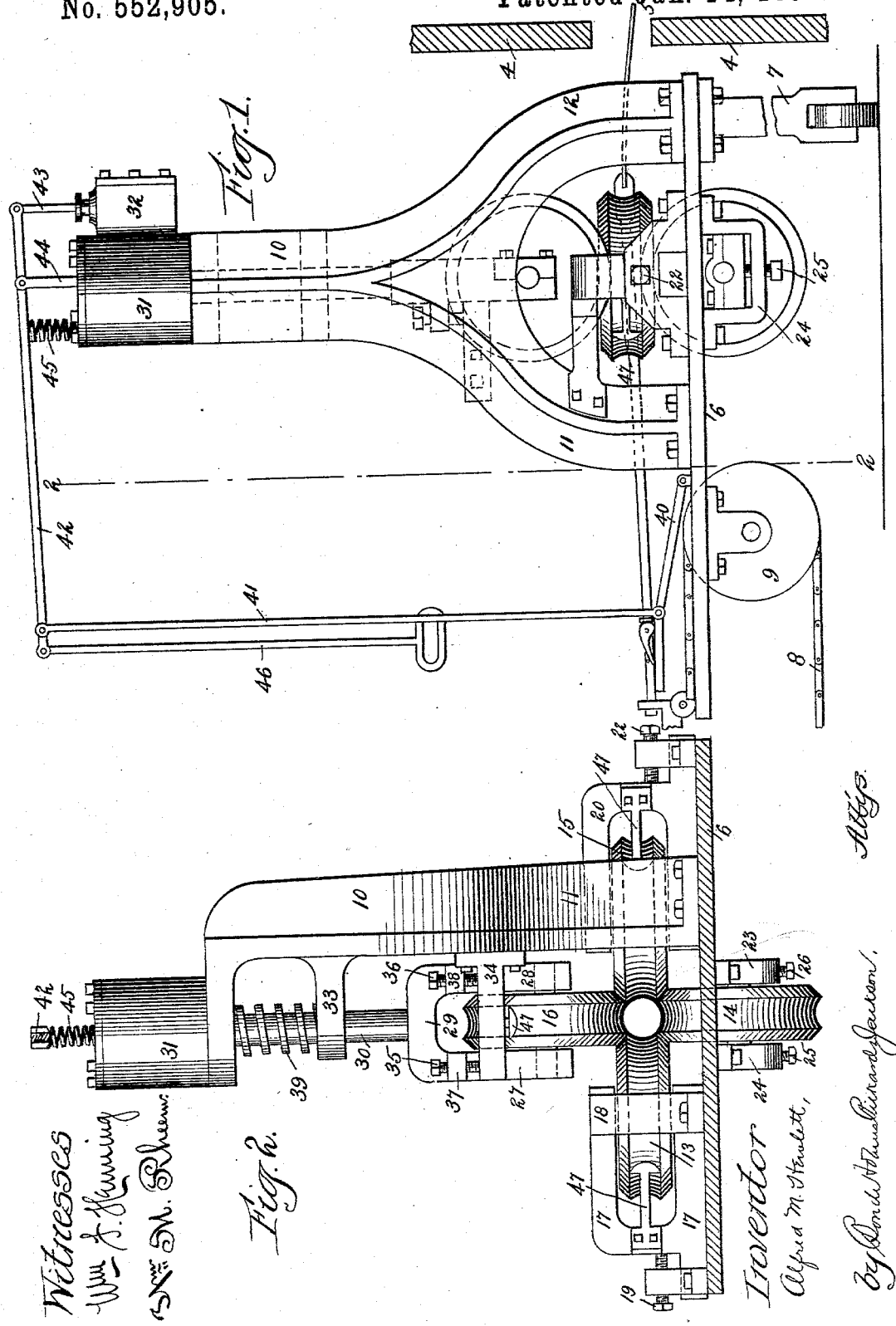

(No Model.) 3 Sheets—Sheet 2.
A. M. HEWLETT.
PIPE MANUFACTURING APPARATUS.
No. 552,905. Patented Jan. 14, 1896.
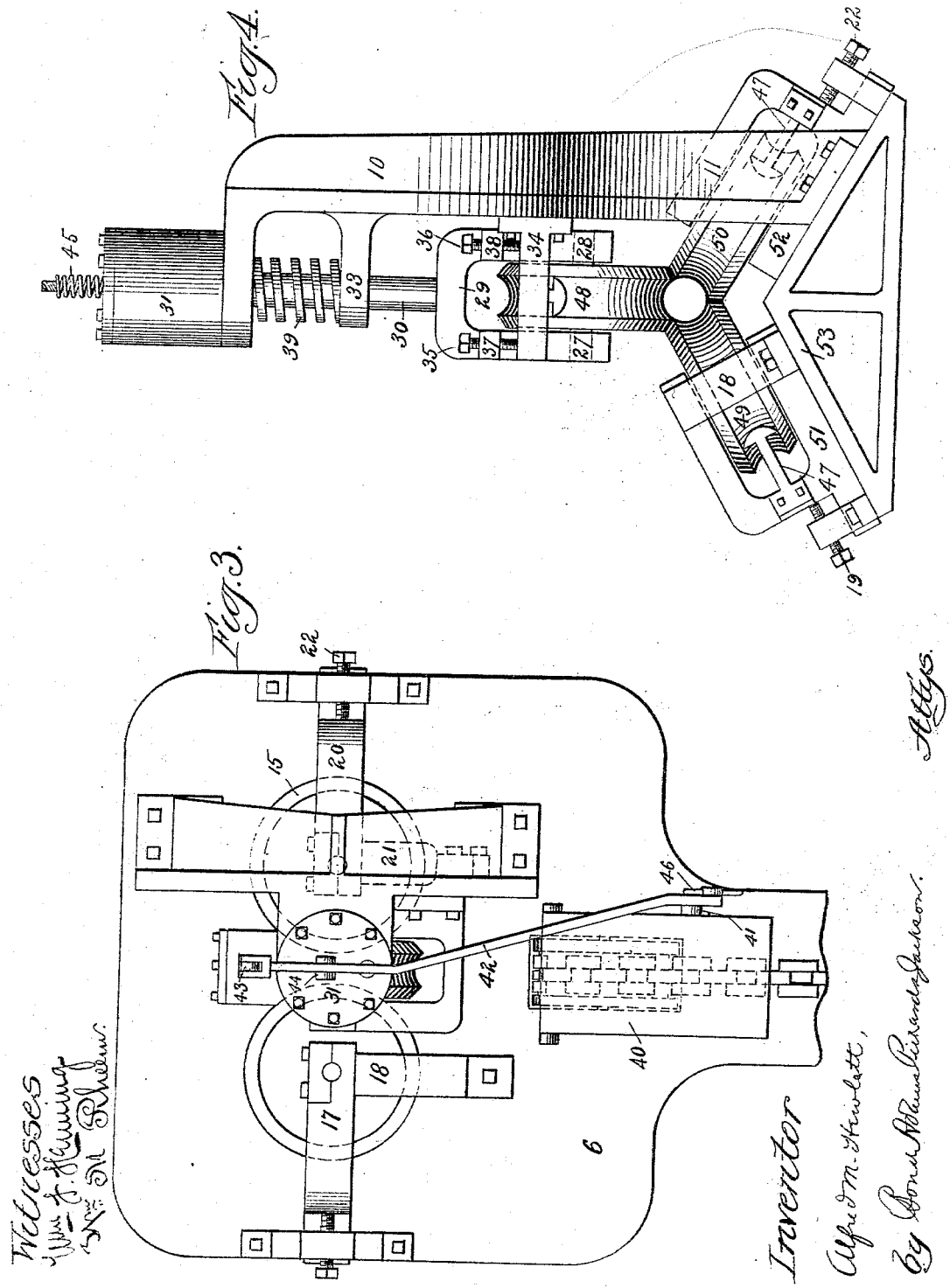

(No Model.) 3 Sheets—Sheet 3.
A. M. HEWLETT.
PIPE MANUFACTURING APPARATUS.
No. 552,905. Patented Jan. 14, 1896.
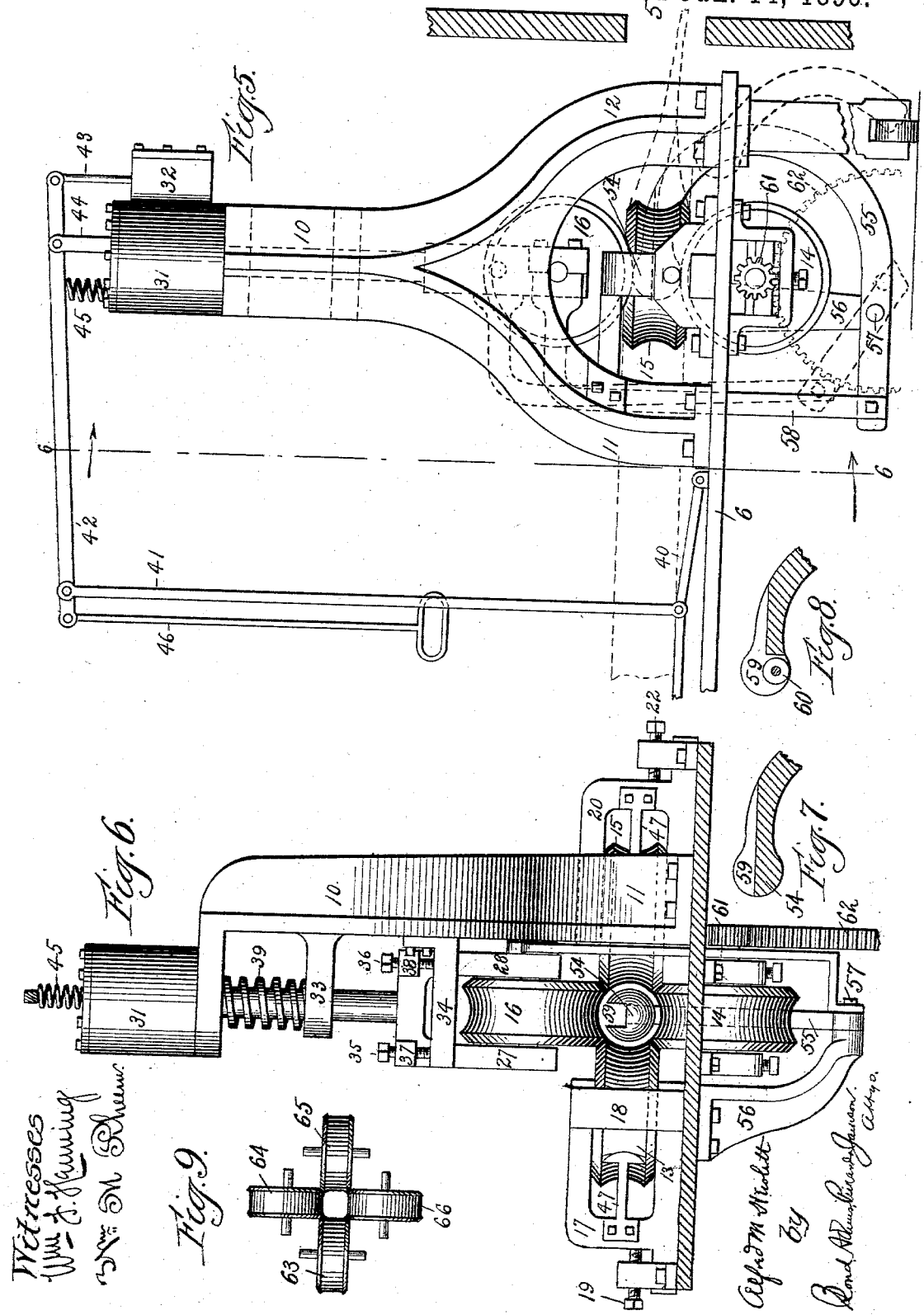

UNITED STATES PATENT OFFICE.

ALFRED M. HEWLETT, OF KEWANEE, ILLINOIS.

PIPE-MANUFACTURING APPARATUS.

SPECIFICATION forming part of Letters Patent No. 552,905, dated January 14, 1896.

Application filed April 1, 1895. Serial No. 544,054. (No model.)

*To all whom it may concern:*

Be it known that I, ALFRED M. HEWLETT, a citizen of the United States, residing at Kewanee, in the county of Henry and State of Illinois, have invented certain new and useful Improvements in Pipe-Manufacturing Apparatus, of which the following is a specification, reference being had to the accompanying drawings, in which—
Figure 1 is a side elevation of the forward end of the draw-bench carrying my improved forming and welding apparatus, part of the furnace-front being in section. Fig. 2 is an end elevation of the forming and welding rolls, being a vertical cross-section on line 2 2 of Fig. 1. Fig. 3 is a plan view of the parts shown in Fig. 2. Fig. 4 is an end view showing a modified arrangement of the forming and welding rolls. Fig. 5 is a side elevation similar to Fig. 1, showing the form of apparatus designed particularly for the manufacture of lap-weld pipe. Fig. 6 is a section on line 6 6 of Fig 5. Fig. 7 is a longitudinal sectional view of one form of internal support used in making lap-weld pipe. Fig. 8 is a similar view of another form of support, and Fig. 9 is an end view showing an arrangement of rolls for the manufacture of square pipe.

My invention relates to the manufacture of pipe by shaping a long narrow strip (commonly called a "skelp") into rounded form, the edges of the strip being welded together. Pipe manufactured in this way is of two kinds, one form being known as "butt-weld," owing to the fact that in its formation the edges of the skelp are shaped so as to abut against each other, the abutting edges being welded together. The other form is known as "lap-weld," because the edges of the strip are lapped and then welded.

In the manufacture of butt-weld pipe it has heretofore been the usual practice to draw a skelp through a die known as a "bell," the die serving to deflect the edges of the skelp, causing them to meet and forcing them together, so that under the high temperature at which the strip was drawn the edges were caused to weld. The skelp was drawn through the bell by means of a tag, either in the form of a strip of metal welded to the leading end of the skelp, or of a pair of tongs by which the end of the skelp was gripped. Suitable drawing apparatus, such as an endless chain carried by a draw-bench or a reciprocating draw-bar, was used for drawing the skelp. This method of manufacturing butt-weld pipe has been in the main satisfactory; but it is quite expensive, owing to the fact that the dies wear out very fast, and owing to the scale which forms every time a bell is used to make a length of pipe it has to be cleaned before it can be used again. Furthermore, a considerable delay is occasioned by the necessity of arranging the bells whenever a length of pipe is drawn.
In the manufacture of lap-weld pipe it has been usual to employ a pair of rolls instead of a bell, which rolls are positively driven. A strip to be formed into pipe is first skelped— *i. e.*, is run through a skelping device which shapes it into rounded form—after which it is reheated and fed between the welding-rolls, the rolls by their rotation drawing it between them. In order to prevent the pipe from collapsing or "buckling in" it is necessary to use a mandrel or core for the pipe. This method of manufacturing lap-weld pipe is expensive for various reasons, among which may be mentioned the necessity for skelping the strip and reheating it before it is rolled into pipe and the considerable loss occasioned by the frequent sticking of the plug in the pipe. It has also been the practice heretofore to use a number of separable rolls arranged in juxtaposition to make a forming-passage for the purpose of drawing pipe; but in such prior construction the rolls have been supported by devices arranged laterally on both sides and inclosing the space at both sides of the rolls, so that a drawing-tool, such as tongs, could not be slipped laterally into the forming-passage, and for this reason such prior constructions are impractical for use with pipe-drawing tools, such as tongs, for the reason that in drawing pipe with tongs the tongs are first attached to the skelp, after which they are slipped laterally into the forming-passage of the rolls. With the prior constructions it would be necessary to slip the tongs into the forming-passage by an endwise movement before their attachment to the skelp, which of course is impractical.

The object of my present invention is to provide improved apparatus which can be used for the manufacture of both butt-weld and lap-weld pipe, and which will avoid the objections above pointed out to the methods heretofore employed. I have discovered that this may be accomplished by forming the flat strip or skelp and simultaneously welding it by drawing the skelp through three or more forming-rolls having concave peripheries so arranged that the combined peripheries of the rolls will form a complete circle, as illustrated in the accompanying drawings, said rolls being supported in a housing which is arranged to present a free and unobstructed passage to said rolls at one side, whereby when the rolls are separated a drawing-tool may be slipped laterally between them. Part or all of the rolls are loosely mounted in the housing—that is, they are not positively driven—so that they serve merely to form the pipe, the skelp being drawn through the rolls by suitable drawing mechanism. By the use of my improved apparatus I am enabled to greatly reduce the expense of manufacturing pipe by simplifying the construction and facilitating the operation.

In the accompanying drawings I have illustrated certain forms of my improved apparatus; but I wish it to be understood that I do not limit myself to the specific details shown and described, as many modifications may be made without departing from the spirit of my invention.

I will first describe that form of apparatus designed especially for the manufacture of butt-weld pipe, after which I will describe the apparatus especially intended for making lap-weld pipe.

Referring to the accompanying drawings, 4 indicates the front wall of the furnace for heating the strips preparatory to their being formed into pipe, 5 being the door through which the strips are withdrawn from the furnace.

6 indicates the forward end of a draw-bench, which is arranged in front of the furnace and is adapted to be moved transversely thereof, the end of the draw-bench nearest the furnace (which will be termed its "forward" end) being mounted upon caster-wheels 7 to permit of this transverse movement.

8 indicates an endless chain passing at its forward end around a pulley 9, which chain serves to draw the skelp in the usual manner, suitable devices being provided for driving said chain.

Instead of using the specific form of draw-bench herein shown any other suitable drawing apparatus may be used.

10 indicates a standard, which is carried by the draw-bench. In the form herein shown the standard 10 is bifurcated at its lower end, forming legs 11 12 which support it, as shown in Fig. 1.

13 14 15 16 indicate forming-rolls, the peripheries of which are provided with a concave channel, each forming an arc of ninety degrees, that portion of the periphery of each roll at the side of the channel being beveled, as shown in Fig. 2, the arrangement being such that when the four rolls are brought together a circular passage will be formed between them.

17 18 indicate brackets arranged at right angles to each other and supported upon the draw-bench 6, which brackets serve as supports for the roll 13. The bracket 17 is adjustably mounted upon the draw-bench, and its adjustment is regulated by a set-screw 19, as shown in Fig. 2. 20 21 indicate similar brackets, (the brackets 21 being shown in dotted lines of Fig. 3 of the drawings,) which support the roll 15, the bracket 20 being also adjustable by means of a set-screw 22.

23 24 indicate brackets supporting the roll 14, which brackets are secured to the under side of the draw-bench 6, as shown in Figs. 1 and 2. Set-screws 25 26 are provided for adjusting the position of the roll 14.

The roll 16 is journaled in brackets 27 28, the upper ends of which are united, forming a yoke 29, as shown in Fig. 2. The yoke 29 is connected to the lower end of a piston-rod 30, the upper end of which is connected to a piston within the steam-cylinder 31.

32 indicates a steam-chest, to which steam is supplied from any suitable source of steam-supply.

33 indicates a guide for the piston-rod, said guide being connected to the standard 10.

34 indicates a stop to limit the downward movement of the piston-rod and the roll 16. The stop 34 is secured to and projects laterally from the standard 10, as shown in Fig. 2. 35 36 indicate set-screws fitted in lugs 37 38 projecting laterally from the brackets 27 28, so that the set-screws will engage the stop 34 when the roll 16 has been moved downward a sufficient distance, and thereby prevent further downward movement of said roll.

39 indicates a spring, which is mounted upon the piston-rod 30, one end of said spring being connected to the piston-rod, the other end being connected to a stationary support. The spring 39 serves to return the roll 16 and piston-rod to their upper position when the steam is shut off. Any other suitable arrangement of the spring may be used.

The standard 10 and brackets hereinbefore described provide a housing for the rolls which is arranged to present a free and unobstructed passage to said rolls at one side, whereby when the rolls are separated a drawing-tool may be slipped laterally between them after the tool has been attached to the skelp.

It will be seen from the above description that by admitting steam into the cylinder 31 the roll 16 will be forced downward into position to co-operate with the other rolls in forming the pipe, and that when the steam is cut off it will be moved upward out of the way. The object of this arrangement is to enable the operator to place the tongs or tag by which the strip is to be drawn in the passage between the rolls. This is necessary, owing to the fact that in the manufacture of pipe the tag or tongs are attached before the strip or skelp is drawn from the furnace, in some instances the tag being attached before the skelp is placed in the furnace to be heated. When welding with a bell, as has heretofore been the usual practice in making butt-weld pipe, the bells have been slipped upon the tag or tongs prior to drawing the skelp from the furnace. With my improved apparatus the tag or tongs may be slipped laterally into the passage between the rolls while the upper roll is out of the way, after which said upper roll is moved down into position and the pipe is formed.

In order to automatically effect the downward movement of the upper roll when everything is ready for drawing the skelp the following apparatus is provided:

40 indicates an inclined plate pivoted at its forward end to the draw-bench, its rear end being in a suitable position to be engaged by the tongs or some other suitable device at the commencement of the drawing operation. The plate 40 is connected by a rod 41 to a lever 42, which operates a throttle-valve 43, the lever 42 being pivoted upon a suitable support 44.

45 indicates a spring which automatically operates the throttle-valve to shut off steam when the lever 42 is released.

46 indicates a hand-bar, also connected to the lever 42, so that the steam may be shut off or admitted to the cylinder 31 by hand.

When a draw-bench and endless chain are used for drawing pipe, it is customary to make use of a device termed a "buggy" for connecting the tongs to the belt. Such a device is illustrated in Fig. 1, and when such device is used it is arranged to engage the plate 40 and open the throttle-valve, the pipe itself serving to keep the plate 40 depressed during the drawing operation and consequently holding the upper roll 16 in operative position until the pipe is completely formed.

In order to remove the scale which is formed by the drawing of the pipe, scrapers 47 are provided, which constantly bear against the concave surfaces of the several rolls and consequently keep them clean.

In Fig. 4 an arrangement is shown by which three rolls instead of four are used, the upper roll 48 being movable and being similarly mounted to the roll 16. Rolls 49 50, arranged at angles of one hundred and twenty degrees to each other and to the roll 48, are mounted in brackets 51 52, similar to the brackets 17 and 20, the brackets 51 52 being mounted upon a supporting-plate 53. I have found, however, four rolls to be more satisfactory than other forms, but wish it to be understood that I do not limit myself to the use of that number, as three or more may be used, as desired.

As above stated, the form of apparatus shown in Figs. 1 to 4 is designed primarily for the manufacture of butt-weld pipe, and for this purpose the rolls are all preferably loosely mounted, although in some instances some of the rolls may be positively driven. In no case, however, should all of the rolls be driven. In Figs. 5 and 6 I have illustrated one arrangement for driving the lower roll, and similar means may, if desired, be provided for one or both of the horizontal rolls; but, as before stated, in manufacturing butt-weld pipe the best results are secured by loosely mounting all the rolls.

The form of apparatus shown in Figs. 1 to 4 is also capable of use for manufacturing lap-weld pipe, provided a suitable core or internal support for the pipe is also used. This core may be of any suitable form, although I have designed an improved automatically-acting core which is particularly intended for use in connection with the vertically-movable roll above described, which support is illustrated in Figs. 5 and 6 of this application, 54 indicating the core, which is carried upon the end of a bar 55 pivoted to a support 56 depending from the draw-bench 6, as shown in Fig. 5, 57 indicating the pivotal point of the bar 55. The rear end of the bar 55 is connected by a rod 58 to one of the brackets, as 28, which supports the upper roll 16, the arrangement being such that as the roll 16 rises one end of the bar 55 will be lifted, throwing the core 54 out of operative position. When the roll 16 descends into operative position, the core 54 will be moved opposite the center of the passage between the rolls, where it will serve as an internal support for the pipe during the forming operation.

It will be understood that the tongs are attached to the upper portion of the pipe, the seam being on the under side, and to permit of the passage of the tongs after the core has been moved into operative position a channel 59 is provided in the upper surface of the core, as shown in Figs. 6, 7 and 8. I also prefer to provide the core 54 with a roller 60 at the point which lies opposite the seam of the pipe, as I find that better results are thereby secured.

The lower roll 14 is positively driven by means of gears 61 62 from any suitable source of power.

In Fig. 9 I have shown rolls 63 64 65 66, the peripheries of which are provided with channels, which when combined form a substantially square passage. This serves to illustrate the manner in which my invention will be applied to the manufacture of square pipe, one of said rolls being arranged to be moved out of the way to permit of the insertion of the tongs or tag.

It should be understood that while I prefer to so arrange the apparatus that the movable roll will move in a vertical plane it may be arranged to move in any other suitable plane, and I therefore do not limit myself to the specific arrangement shown.

I am aware that I am not the first to use a number of rolls arranged in juxtaposition to make a forming-passage for the purpose of drawing pipe. Neither am I the first to make such rolls separable; but in all prior constructions with which I am acquainted the rolls have been supported by devices arranged laterally on both sides and inclosing the space at both ends of the rolls, so that with such construction a drawing-tool, such as tongs, could not be slipped laterally into the forming-passage, and the principal feature of my present invention consists in such an arrangement of the housing in connection with the rolls that when the rolls are separated there will be nothing to prevent such lateral admission of the drawing-tool. The prior constructions above referred to are impractical for use with pipe-drawing tools, such as tongs, for the reason that in drawing pipe with tongs the tongs are first attached to the skelp, after which the tongs are slipped laterally into the forming-passage of the rolls. With the prior constructions above referred to it would be necessary to slip the tongs into the forming-passage by an endwise movement before their attachment to the skelp, which of course is impractical.

That which I claim as my invention, and desire to secure by Letters Patent, is—

1. In a pipe-making apparatus, the combination with a series of rolls arranged in juxtaposition to present a forming passage, of means for separating said rolls, and a housing for said rolls, said housing being arranged to present a free and unobstructed passage to said rolls at one side, whereby when said rolls are separated a drawing tool may be slipped laterally between them, and means for drawing a strip through said forming passage, substantially as described.

2. In a pipe-making apparatus, the combination with a series of rolls arranged in juxtaposition to present a forming passage, one of said rolls being vertically movable, and a housing for said rolls, said housing being arranged to present a free and unobstructed passage to said rolls at one side, whereby when said rolls are separated a drawing tool may be slipped laterally between them, means for drawing a strip through said forming passage and means for moving said movable roll vertically substantially as described.

3. In a pipe-making apparatus, the combination with a series of rolls arranged in juxtaposition to present a forming passage, one of said rolls being vertically movable, a supporting device for said movable roll, said supporting device being arranged at one side of said roll, whereby when said roll is moved away from the other rolls an unobstructed passage will be presented for the admission laterally of a drawing tool, a steam cylinder carried by said lateral support for reciprocating said movable roll, and means for drawing a strip through said forming passage, substantially as described.

4. In a pipe-making apparatus, the combination with a furnace and a transversely movable draw-bench, of a series of rolls mounted upon said draw-bench, said rolls being arranged in juxtaposition to present a forming passage, a housing for said rolls, said housing being arranged to present a free and unobstructed passage to said rolls at one side, whereby when said rolls are separated a drawing tool may be slipped laterally between them, means for separating said rolls, and means for drawing a strip through said forming passage, substantially as described.

5. In a pipe-making apparatus, the combination with a standard 10, piston rod 30 supported thereby, means for reciprocating said piston rod, a bracket connected to said piston rod, and a roll 16 journaled in said bracket, of rolls adapted to co-operate with said roll 16 to make a forming passage and supporting brackets for the lateral rolls, whereby said rolls may be separated to present a free and unobstructed lateral passage for the admission of a drawing tool, and means for drawing a strip through said forming passage, substantially as described.

6. In pipe-making apparatus, the combination with a series of rolls arranged in juxtaposition to present a forming passage, of mechanism for drawing a strip through said passage, a core for internally supporting said strip, and means for automatically moving said core into operative position when a strip is to be drawn, substantially as described.

7. In pipe-making apparatus, the combination with a series of rolls arranged in juxtaposition to present a forming passage, one of said rolls being vertically movable, of mechanism for moving said movable roll vertically, a core, and means for automatically moving said core into operative position when said movable roll is moved into operative position, substantially as described.

8. In pipe-making apparatus, the combination with a series of rolls arranged to present a forming passage, and means for drawing a strip through said passage, one of said rolls being vertically movable, of a cylinder and piston for operating said vertically-movable roll, a plate 40, and devices operated by the movement of said plate to admit steam to said cylinder, substantially as and for the purpose specified.

9. In pipe-making apparatus, the combination with a series of rolls arranged in juxtaposition to present a forming passage, one of said rolls being vertically movable, of mechanism for moving said roll vertically, a core 54, a pivoted lever 55 supporting said core, and devices operated by said movable roll to rock said lever and throw said core into and out of operative position, substantially as described.

ALFRED M. HEWLETT.

Witnesses:
H. W. TRASK,
E. C. KENT.